(12) United States Patent
Kogut-O'Connell et al.

(10) Patent No.: US 6,658,427 B2
(45) Date of Patent: Dec. 2, 2003

(54) METHOD AND SYSTEM FOR PROVIDING MULTI-USER ELECTRONIC CALENDARING AND SCHEDULING FUNCTIONS FOR ONLINE INSTRUCTION IN AN EXTENDED ENTERPRISE ENVIRONMENT

(75) Inventors: Judy J. Kogut-O'Connell, Hopewell Junction, NY (US); Ryan S. Carrington, Foster City, CA (US); Jackie L. Hill, Los Angeles, CA (US); Catherine Ng, Elmhurst, NY (US); Dallas J. Pesola, Marquette, MI (US); Ann T. Storms, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 09/879,298

(22) Filed: Jun. 12, 2001

(65) Prior Publication Data

US 2002/0188607 A1 Dec. 12, 2002

(51) Int. Cl.[7] .............................................. G06F 17/30
(52) U.S. Cl. ................................ 707/103 Y; 707/104.1; 705/8; 705/9
(58) Field of Search ............................. 707/1, 3, 4, 6, 707/9, 10, 102, 513, 103 Y, 104.1, 204; 705/8, 9

(56) References Cited

U.S. PATENT DOCUMENTS

| 6,002,915 | A | * | 12/1999 | Shimizu ..................... 434/350 |
| 6,012,037 | A | | 1/2000 | Yoshikawa ..................... 705/8 |
| 6,016,478 | A | * | 1/2000 | Zhang et al. ................... 705/9 |
| 6,018,343 | A | | 1/2000 | Wang et al. .................. 345/356 |
| 6,049,801 | A | | 4/2000 | Whitmyer, Jr. ............... 707/10 |
| 6,064,977 | A | * | 5/2000 | Haverstock et al. ........... 705/9 |
| 6,101,480 | A | | 8/2000 | Conmy et al. ................. 705/9 |

* cited by examiner

*Primary Examiner*—Charles Rones
(74) *Attorney, Agent, or Firm*—Jay Anderson; Cantor Colburn LLP

(57) ABSTRACT

An exemplary embodiment of the invention relates to a computer-based method and system for providing multi-user electronic calendaring and scheduling functions in an extended enterprise environment. The method includes scheduling trainees for online classes conducted by a training system, presenting a template pertaining to an open class time, associating scheduled class data to the scheduler for tracking and confirmation purposes, emailing notifications to trainees, updating class registration and related databases in real time via replication functions, aggregating and transmitting class registration data to the training system, and transmitting results of classes to trainees and the scheduler all via a multi-user electronic calendaring and scheduling application.

27 Claims, 3 Drawing Sheets

METHOD AND SYSTEM FOR PROVIDING MULTI-USER ELECTRONIC CALENDARING AND SCHEDULING FUNCTIONS FOR ONLINE INSTRUCTION IN AN EXTENDED ENTERPRISE ENVIRONMENT

BACKGROUND

This invention relates generally to computer-based training management, and more particularly, this invention relates to a computer-based method and system for providing multi-user electronic calendaring and scheduling functions related to online instruction in an extended enterprise environment.

Online education has become a popular form of learning, particularly for individuals who are remotely located from a particular university, require a self-paced program, or are physically disabled. In one application of Internet-based training (or digital learning), subject materials are presented simultaneously to groups of students in virtual classrooms. Virtual instructors coordinate the lessons and present content while students interactively participate and conduct threaded discussions among one another. Testing is provided online, and assessments and feedback are later provided.

Another application of Internet-based training (IBT) is known as "self-paced instruction" or "e-learning". E-learning is anywhere, anytime self-paced online instruction. This delivery option offers interactive CD-ROM, diskette and textbook formats. Multi-media courseware can be acquired via the World Wide Web where interested students can choose from comprehensive 'certification programs', single subject courses, or even 'just-in-time' modules which target narrowly tailored, mission-critical, and time-sensitive topics. Just-in-time training allows business managers to instantly link specific employee training to real business problems.

A growing number of businesses are discovering the advantages of online education in the workplace. IBT provides a cost-effective and convenient means to qualify employees for particular jobs. IBT can save time and money and maximize businesses' training investments by eliminating the travel necessary to attend training facilities.

Before Internet-based education evolved, large businesses with geographically dispersed offices often found that employee training programs were disjointed and repetitive. For example, a company with offices in Europe implements an internally-developed training program for new employees which, by virtue of its customization, is inconsistent with similar programs offered by the company's correlative offices in the United States. As employees transfer between facilities, through relocation, promotion, or otherwise, these disparate training programs can result in confusion, corporate misalignment, and substandard job performance. Even worse, duplicative programs held in parallel at multiple facilities utilizing multiple human resources and materials are costly and wasteful.

Today, businesses are consolidating and standardizing their training programs and presenting them online, substantially eliminating the disadvantages listed above. These new online programs continue to be fueled by new and innovative technology that enhance the administration, execution, and tracking of the programs such as calendar, workflow, and messaging tools.

Solutions known to exist in this area include those provided by online applications service providers (ASPs) which host vendor-authorized training programs, individual and group training programs, as well as courseware development and technical assistance. Content delivery may occur via an Intranet or Internet medium and services may include hosting the server for the customer. Open content delivery tools include computer-based training, Internet-based training, Web-based training, distance learning, multimedia, CD, synchronous and asynchronous delivery tools. The individual or organization to be trained registers for these training sessions and the course content is delivered by the ASP over the World Wide Web. The ASP handles student enrollment, online payment, course grading and student feedback over the Web as well.

With the advent of the extended enterprise in today's global economy, the expansion of Internet-based training programs to include not only employees of a business enterprise but also its trading partners is necessitated to the extent that they all share common goals and mission-critical learning needs. Extended enterprises are formed when trading partners agree to allow each other access to information on their private networks in an effort to streamline operations. This limited network access can be achieved and controlled via encryption technologies, communication gateway devices, or a combination of suitable hardware and software tools. In a typical supply chain, for example, independent entities forming an extended enterprise may include manufacturers, suppliers, contractors, commercial warehouses and shipping companies. Over a network, these entities collaboratively perform traditional supply chain functions such as product ordering, product or process change notifications, end-of-life notices, product fulfillment, shipping, etc. which have been digitized through the use of open standards, such as Java and XML. As the use of real-time, IT-enabled business methods continue to rise, organizations must keep pace by acquiring innovative approaches to existing training and knowledge management practices. Large business enterprises often employ a variety of sophisticated and customized software applications designed around specific tasks or business rules and which require a working knowledge by all involved users within the extended enterprise. Thus, it has become essential that each entity within the extended enterprise acquire and maintain the necessary core competencies in order to effectuate a seamless virtual corporation environment.

One solution offered by the ASP or commercial software tool in implementing the above services includes automatic scheduling and calendaring functions in which searches are conducted for available time slots from user systems' calendars contained within a predefined invitee list and, when located, are filled accordingly. This scenario, however, requires that users' calendars be on the same database as the scheduling program. Linking a large volume of calendars to a program may not be the most cost-effective means for scheduling training classes, particularly where the sessions are one time, non-recurring events.

Further, a great deal of system setup may be required before this scheduling tool can be fully functional, such as establishing profiles of invitees, determining access capabilities to invitee calendars, etc. Additionally, this system is Web-dependent and does not provide for access by those systems which are not Web-enabled. Other drawbacks also exist such as software and system incompatibility, difficulties in keeping database registration data current, etc.

A process is therefore required that can fully implement the calendaring and scheduling of computer-based training for members of an extended enterprise including real-time scheduling functions, confirmation transmittals, course updates, course completion data, and reporting tools over a network and in which the using systems are not required to be web-enabled.

BRIEF SUMMARY

An exemplary embodiment of the invention relates to a computer-based method and system for providing multi-user electronic calendaring and scheduling functions for online instruction in an extended enterprise environment. The multi-user electronic calendaring and scheduling system of the present invention includes an electronic calendar system and global application which displays real-time availability of educational conference calls or classes and allows users to register people for the classes without the need for a web browser program. The invention also generates automatic emails, such as registration confirmations, course schedules and changes, and training assessments, as well as documentation for the class. The scheduler selects an available class and enters data about the student. The application automatically sends a confirmation and reminder message to the student via email and/or facsimile. The confirmation may include class materials, conference call logistics, and registration agreements if a signature is required. Prior to each conference call, the students' data is exported from the application's database and sent to the training center in a complementary file format recognized by the center's workflow system. Upon completion of the conference call, training center personnel enter the results of each student into the application which then automatically sends the results information, via email, to the appropriate scheduler. Reporting tools and statistical analysis tools are also available.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
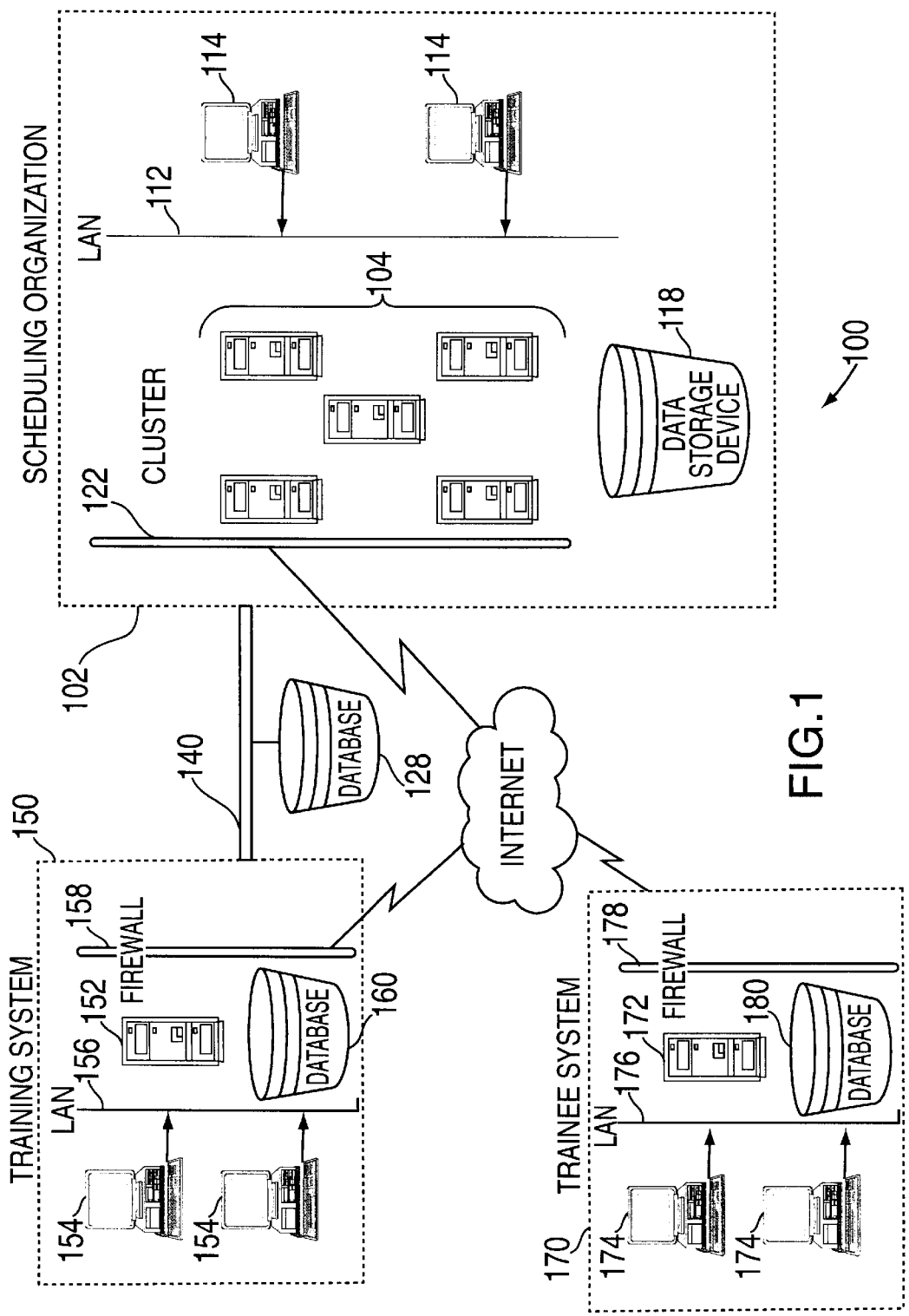
FIG. 1 is a block diagram of a portion of the system that includes a plurality of client systems and servers on which the multi-user electronic calendaring and scheduling tool is implemented.

In an exemplary embodiment, the multi-user electronic calendaring and scheduling application is implemented through a networked system such as that shown in FIG. 1. Although not necessary to realize the advantages of the present invention, system 100 may be part of a wide area network in which different geographical locations are interconnected, either by high-speed data lines or by radio links, interconnecting hundreds of workstations at widely disparate locations. In the simplified diagram of FIG. 1, system 100 includes a scheduling organization 102 operating in a client/server architecture model. Scheduling organization 102 comprises server cluster 104 and data storage device 118 connected through network 112 to client systems 114. The term "scheduling organization" refers to the system implementing the multi-user electronic calendaring and scheduling application of the present invention. Network 112 may comprise a LAN, a WAN, a MAN, or other network configuration known in the art. Further, network connections may include wireless technology, radio-based communications, telephony-based communications, or a combination of the above. For purposes of illustration, however, network 112 is a LAN Intranet. Access is limited to internal devices and applications through firewall 122, which protects scheduling organization 102 from unauthorized access.

Scheduling organization 102 is running suitable multi-platform supported server software for creating secure, interactive Internet and Intranet applications, and which allows information in data storage device 118 to be presented to end users or client systems via replication capabilities. For purposes of illustration, scheduling organization 102 is running Lotus Domino (TM) as its server software. Domino(TM) has been selected for its object-oriented design features. Scheduling organization 102 executes the multi-user electronic calendaring and scheduling tool, among other applications via one or more servers of server cluster 104, client systems 114, or a combination of the above. Scheduling organization 102 is also running a groupware application such as Lotus Notes (TM) which allows client systems to access information through its replication capabilities, provides e-mail services, and supports a secure intranet/extranet architecture.

Data storage device 118 resides within intranet 112 and may comprise any form of mass storage device configured to read and write database type data maintained in a file store (e.g., a magnetic disk data storage device). Preferably, data storage device 118 is configured to support an object-oriented architecture. Data storage device 118 is logically addressable as a consolidated data source across a distributed environment such as network system 100. The implementation of local and wide-area database management systems to achieve the functionality of data storage device 118 will be readily understood by those skilled in the art. Information stored in data storage device 118 is retrieved and manipulated via one or more servers of server cluster 104. Server cluster 104 is a combination of Domino(TM) servers which allows scheduling organization 102 to maintain up-to-date training schedules, class registrations, and other data in a real-time environment through its replication features. Servers in server cluster 104 share information with each other, as well as with client systems, storing the most current data for access by user systems.

Data storage device 118 provides a repository for a variety of information used by the multi-user electronic calendaring and scheduling tool such as course data for each training facility affiliated with scheduling organization 102, student registration data, email addresses, and reporting tools. These features are further described herein.

Training system 150 is typically an existing or prospective training facility of scheduling organization 102. Training system 150 comprises a server 152 that connects client systems 154 to a network 156 and to the Internet. Firewall 158 provides security and protection against unauthorized access to internal network information from outside sources. Each of client systems 154 may access server 152 via Lotus Notes(TM)-compliant software located on workstations 154. Software may be Lotus Notes(TM) although it is not necessary in order to realize the advantages of the present invention. For example, training system 150 may operate web browser software in order to perform the functions necessary via the multi-user electronic calendaring and scheduling tool described herein. A data storage device 160 is coupled to server 152. A replica 128 of a selected database from data storage device 118 is accessible to system 150 via extranet 140 or via the Internet.

The multi-user electronic calendaring and scheduling tool is an e-business application that provides an environment for performing scheduling functions, providing multi-level communications among disparate computer systems, storing resulting data acquired in an organized, central location, and allowing constant access to authorized users around the world. All training facilities with proper authorization have access to the tool.

Scheduling personnel of organization 102 have access to the multi-user electronic calendaring and scheduling tool both in their office and while traveling by using a replica of the Lotus Notes (TM) databases from data storage device 118. The scheduler can edit the information via the multi-user electronic calendaring and scheduling tool and replicate it at his/her earliest convenience. Additionally, applications running on server cluster 104 may be programmed to systematically conduct scheduled replications, whereby database replicas are temporarily stored in a queue awaiting replication (not shown). Replications may be scheduled by scheduling organization 102 as frequently as desired in order to provide access to the most current, up-to-date information.

The goal of the multi-user electronic calendaring and scheduling tool is to provide access to the most complete, up-to-date information regarding newly scheduled, tentative, completed conference classes and rescheduled appointments for authorized users, facilitating and streamlining the supplier/trainee training processes.

The multi-user electronic calendaring and scheduling tool includes Lotus Notes (TM) databases that reside on data storage device 118. Data storage device 118 resides within organization's 102 intranet 112. Since it is within intranet 112, it is accessible to all of organization's 102 employees who have proper access permissions. These databases can be replicated to portable devices, such as laptop computers, PDAs, etc., allowing access to information while traveling. Many replicas may be necessary and will depend upon the number of authorized systems, suppliers, and training facilities requiring access to organization's 102 information.

Figure 2:
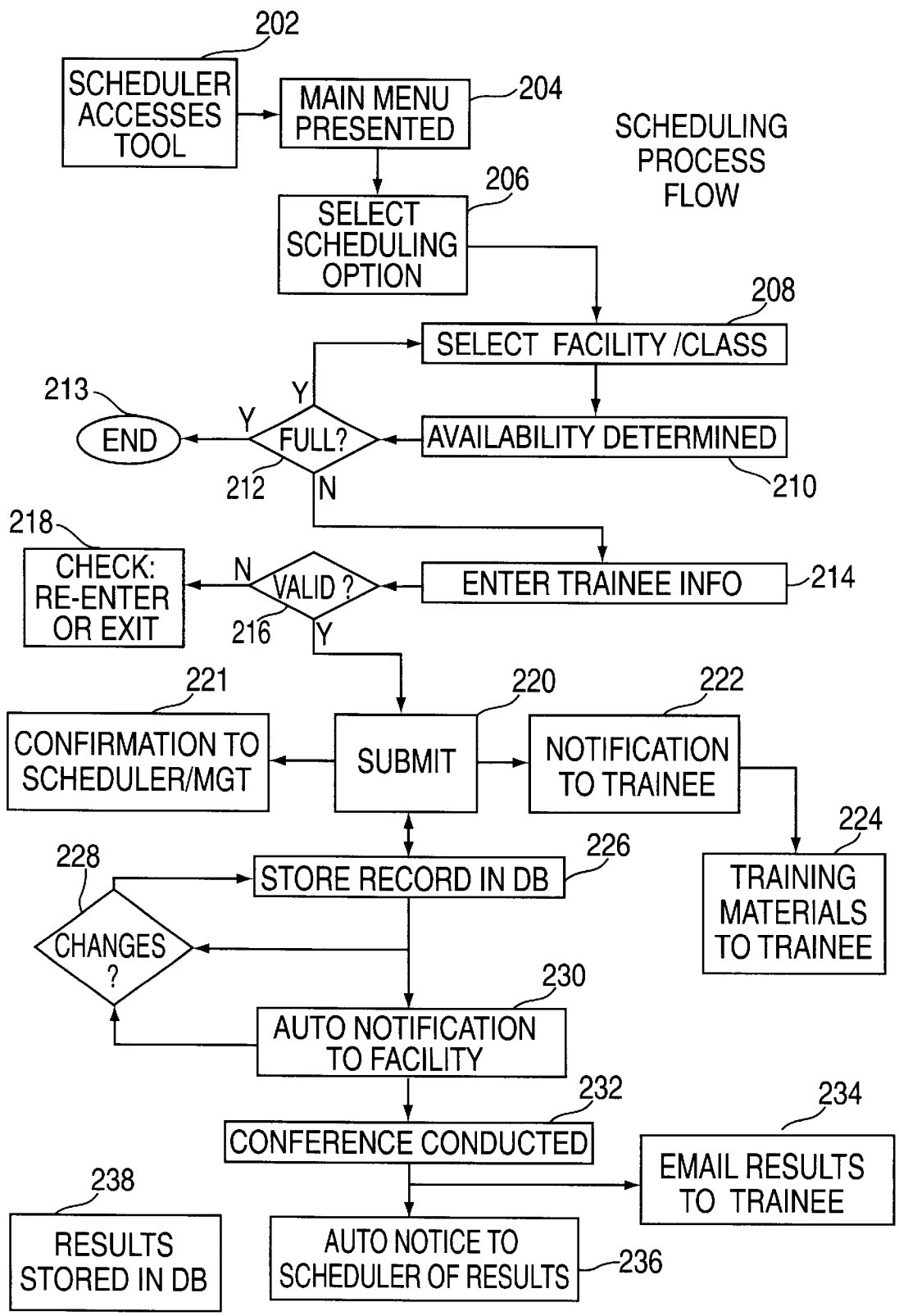
FIG. 2 is a diagram illustrating the process of scheduling a trainee for a conference call by a scheduling organization.

Trainee system 170 represents a trading partner or extended enterprise partner of scheduling organization 102 such as a supplier. Trainee organization 170 is operating email software via the Internet as well as any internal applications desired by trainee system 170 in order to receive email notifications from organizations 102 and 150. System 170 also includes a network or communications link 176 and a data storage device 180. Employees of system 170 negotiate the scheduling of classes with scheduling organization 102 conducted by training system 150. Once entered into the multi-user electronic calendaring and scheduling system, the trainee at trainee system 170 receives automatic email notifications from the tool concerning course dates, times, and materials. If any changes are subsequently made to the course content and/or time, the trainee is likewise apprised of this information by email. Performance results can also be automatically transmitted via email to the trainee and/or the trainee's manager for tracking purposes, as well as to the scheduler or "user". A framework for the flow of information associated with the multi-user electronic calendaring and scheduling tool is described from the point of view of three types of system users: scheduling personnel (also referred to as 'user'); training facilities, the training resources utilized by the scheduling organization; and supplier representatives or trainees, who submit to the training program or conference calls in order to qualify to do business with the scheduling organization. This flow of information is systematically integrated and organized via the multi-user electronic calendaring and scheduling tool as shown generally in FIG. 2.

A scheduler accesses the multi-user electronic calendaring and scheduling tool because of a need for supplier and/or technology qualification at step 202. For example, a procurement group within a large multi-national business enterprise utilizes a standardized computer process for facilitating procurement activities among its internal staff as well as with third party trading partners. The computer process involves accessing web-based purchase order forms and other procurement-related forms and providing specific data about the items to be ordered, shipping data, alternative arrangements, etc. Pre-defined templates of various types are available to suppliers to relay this information. In order to ensure a seamless and systematic flow of information, all parties accessing the system must be trained on its use. Further, as educated suppliers leave their employment and new suppliers replace them, continued training and refresher classes become necessary.

Figure 3:
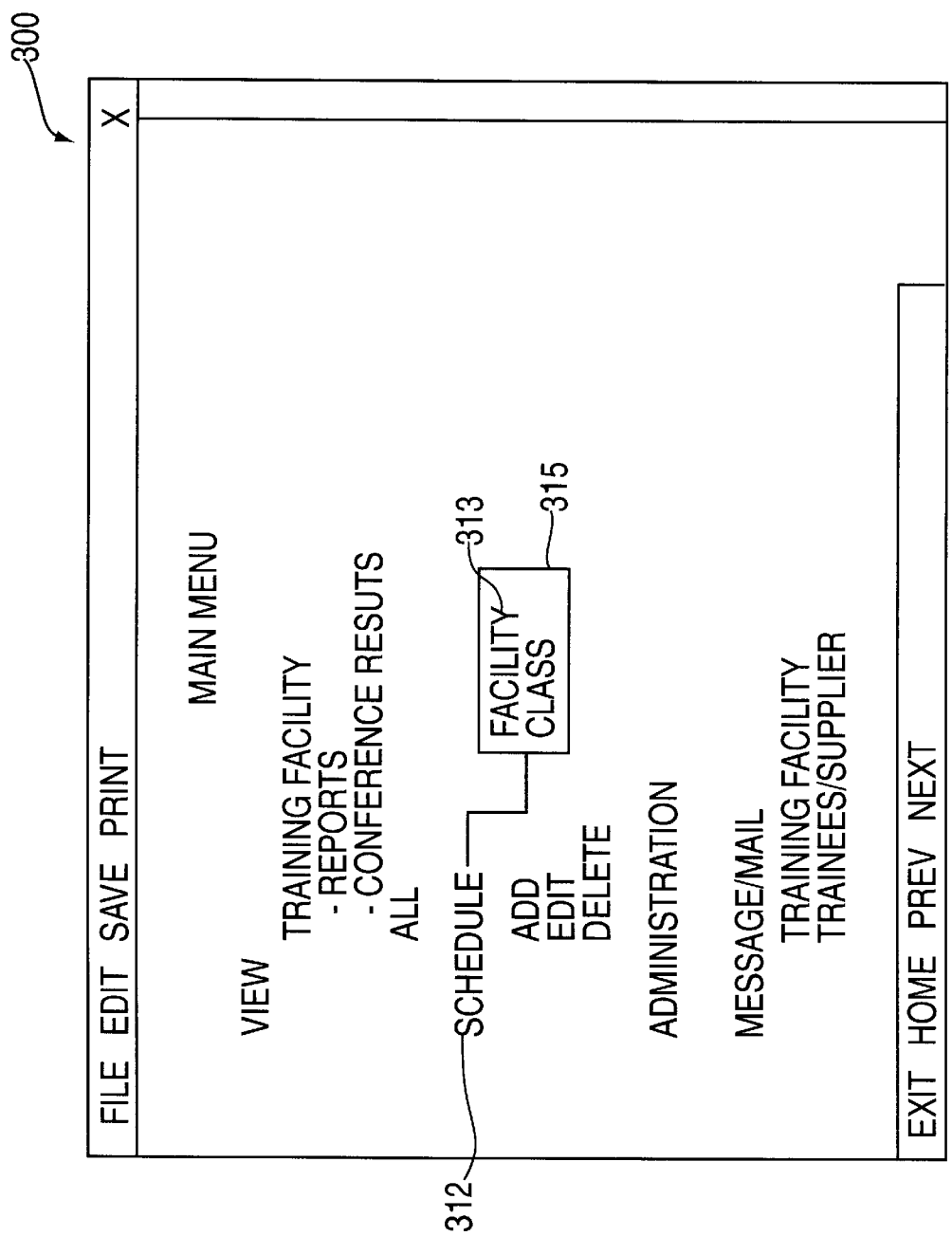
FIG. 3 is a sample computer menu screen for the multi-user electronic calendaring and scheduling tool illustrating the various functions which can be performed utilizing the tool.

One or more individuals from the procurement group may be tasked with ensuring that only those suppliers who are trained to use the system may be permitted to be used as qualified trading partners for the procurement's organization. This individual is henceforth referred to as a 'scheduler'. The training provided to the supplier (also referred to as 'trainee') is referred to as a conference call or online class. The scheduler accesses the organization's multi-user electronic calendaring and scheduling tool icon at step 202 which, in turn, causes the multi-user electronic calendaring and scheduling tool to display a main menu screen window 300 of FIG. 3 at step 204. The user then selects the "SCHEDULE" option 312 from main menu window 300 at step 206. The scheduling main menu window is designed from a user's point of view, to make the selection process visual and simple. The user then clicks on "FACILITY" 313 from the drop down window 315 at step 208 where the user is transferred over to the multi-user electronic calendaring and scheduling training facility database located in data storage device 118. Alternatively, if only one training system is utilized by scheduling organization 102, the user is prompted to select a class rather than a facility at step 208.

The user then receives one of two messages presented by the tool depending upon whether the class is open for enrollment or has filled up at step 210. If the class is full (212), a message "This time slot closed" is displayed. The user is then directed to either revert back to the SCHEDULE 312 option at step 208 in which another time or program may be selected, or may quit the program at step 213. The process continues once again at step 210. If the conference is not full, the user receives the message "Click here to book" and is asked to enter information pertaining to the trainee at step 214. The tool checks to see if all pertinent information has been entered at step 216. If not, the user is directed to review the data entered at step 218 or may exit or abort the selection. Once valid, the user selects 'submit' on the bottom of the screen (not shown) at step 220 and the tool generates an email notification to the trainee of trainee system 170 at step 222 as well as a confirmation notice to the scheduler at scheduling organization 102 at step 221. Training materials are delivered to the trainee at step 224 either via email attachment or physical delivery. Once the information is submitted to the tool, it is stored in the tool's database awaiting further processing at step 226. If changes are required to be made to the schedule prior to the conference date, they may be entered at step 228 where they are again stored in a database. At a predetermined time period established by the tool or by either organization, the entire scheduling information stored in the database and pertaining to a particular conference is transmitted to the training facility at step 230. Prior to the conference date, the schedule may adjusted at step 228 and the process reverts back to step 226 where the new information is stored in the database. At step 232 the conference is conducted and the results are emailed or otherwise delivered to the trainee at step 234. Automatic notification of results are transmitted to the scheduling organization at step 236 which are stored in a database at step 238.

The multi-user electronic calendaring and scheduling tool provides continuous access to the most complete information on conferences, scheduling, and modifications, enabling an organization to better accommodate and ensure that its suppliers maintain strict qualification levels, and deliver consistent information to all necessary parties.

While preferred embodiments have been shown and described, various modifications and substitutions may be made thereto without departing from the spirit and scope of the invention. Accordingly, it is to be understood that the present invention has been described by way of illustration and not limitation.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

What is claimed is:

1. A method for providing multi-user calendaring and scheduling functions over a communications network in an extended enterprise environment, comprising:

receiving a request to schedule a trainee for a class, said class provided by a training system;
wherein said class is selectable from a database of classes stored by a scheduling organization;
presenting a template pertaining to an open class time via database replication, wherein said scheduling organization provides input relating to said tranee;
receiving said input;
associating said input to an identification of a scheduler from said scheduling organization;
sending a confirmation to said trainee;
storing said input;
aggregating data records pertaining to said class;
transmitting said data records to said training system;
upon completion of said class, transmitting results of said class to:
said scheduling organization according to said identification; and
said trainee; and
storing said results in a database; wherein said scheduling organization is executing a multi-user electronic calendaring and scheduling application.

2. The method of claim 1, further comprising:
receiving a request to edit said input, wherein said request to edit said input causes said multi-user electronic calendaring and scheduling application to automatically update changes in said database resulting from said request to edit.

3. The method of claim 1, further comprising:
receiving a request to reschedule a class, wherein said request to reschedule causes said multi-user electronic calendaring and scheduling application to automatically update changes in said database resulting from said request to reschedule.

4. The method of claim 1, wherein said trainee is a trading partner of said scheduling organization.

5. The method of claim 1, wherein said extended enterprise environment includes:
said scheduling organization, and
a trainee system, wherein said trainee is an employee of said trainee system.

6. The method of claim 1, wherein said class is conducted online.

7. The method of claim 1, wherein said template includes fields for input pertaining to:
said training system;
said class;
said trainee; and
said scheduling organization.

8. The method of claim 1, wherein said sending a confirmation includes email transmission and facsimile transmission.

9. The method of claim 1, wherein said confirmation includes:
class description;
class time;
class prerequisites; and
class materials.

10. A storage medium encoded with machine-readable computer program code for providing multi-user calendaring and scheduling functions over a communications network in an extended enterprise environment, the storage medium including instructions for causing a computer to implement a method comprising:

receiving a request to schedule a trainee for a class, said class provided by a training system;
wherein said class is selectable from a database of classes stored by a scheduling organization;
presenting a template pertaining to an open class time via database replication, wherein said scheduling organization provides input relating to said trainee;
receiving said input;
associating said input to an identification of a scheduler from said scheduling organization;
sending a confirmation to said trainee;
storing said input;
aggregating data records pertaining to said class;
transmitting said data records to said training system;
upon completion of said class, transmitting results of said class to:
said scheduling organization according to said identification; and said trainee; and storing said results in a database; wherein said scheduling organization is executing a multi-user electronic calendaring and scheduling application.

11. The storage medium of claim 10, further comprising:

receiving a request to edit said input, wherein said request to edit said input causes said multi-user electronic calendaring and scheduling application to automatically update changes in said database resulting from said request to edit.

12. The storage medium of claim 10, further comprising:

receiving a request to reschedule a class, wherein said request to reschedule causes said multi-user electronic calendaring and scheduling application to automatically update changes in said database resulting from said request to reschedule.

13. The storage medium of claim 10, wherein said trainee is a trading partner of said scheduling organization.

14. The storage medium of claim 10, wherein said extended enterprise environment includes:

said scheduling organization, and a trainee system, wherein said trainee is an employee of said trainee system.

15. The storage medium of claim 10, wherein said class is conducted online.

16. The storage medium of claim 10, wherein said template includes fields for input pertaining to:

said training system;

said class;

said trainee; and said scheduling organization.

17. The storage medium of claim 10, wherein said sending confirmation includes email transmission and facsimile transmission.

18. The storage medium of claim 10, wherein said confirmation includes:

class description;

class time;

class prerequisites; and class materials.

19. A system for providing multi-user calendaring and scheduling functions over a communications network in an extended enterprise environment, comprising:

a scheduling organization, including:

a server cluster;

a data storage device, said data storage device housing:

class offerings;

class schedules; and class availability statuses;

a template of open class times, said open class times provided via database replication of said class availability statuses;

a network link; and at least one client system; wherein said server cluster, said data storage device, and said at least one client system are in communication with each other via said network link;

a link to a training system; and a link to a trainee system; wherein said scheduling organization, said training system, and said trainee system are in communication with each other via said communications network, and wherein further, said extended enterprise environment is executing a multi-user electronic calendaring and scheduling application.

20. The system of claim 19, wherein said scheduling organization and said training system communicate via an extranet.

21. The system of claim 19, wherein said scheduling organization and said training system communicate via the Internet.

22. The system of claim 19, wherein said scheduling organization and said trainee system communicate via email.

23. The system of claim 19, wherein said multi-user electronic calendaring and scheduling application is executed by said scheduling organization.

24. The system of claim 19, wherein said multi-user electronic calendaring and scheduling application is executed by said training system.

25. The system of claim 19, wherein said scheduling organization facilitates registration activities related to classes offered by said training system on behalf of said trainee system via said multi-user electronic calendaring and scheduling application.

26. The system of claim 19, wherein said registration activities include:

entering data into said at least one client system related to an individual associated with said trainee system;

tracking attendance of classes via said communications network;

tracking results of classes attended;

rescheduling previously registered individuals from said trainee system who did not attend a class for which said individuals were registered;

rescheduling scheduled classes upon notice that said classes will not be conducted; and reporting statistics and summaries related to said classes attended and said classes not attended.

27. The system of claim 19, wherein said server cluster facilitates updated information related to registration activities.

* * * * *